PATTERSON & HILL.
Coffee Pot.

No. 76,514.

Patented April 7, 1868.

Witnesses:

Inventors

UNITED STATES PATENT OFFICE.

JAMES WILLARD PATTERSON AND JOSEPH STACY HILL, OF CINCINNATI, OHIO.

IMPROVEMENT IN COFFEE-POTS.

Specification forming part of Letters Patent No. 76,514, dated April 7, 1868.

*To all whom it may concern:*

Be it known that we, JAMES WILLARD PATTERSON and JOSEPH STACY HILL, both of Cincinnati, in the county of Hamilton and State of Ohio, have invented an Improvement in Tea and Coffee Pots; and we do hereby declare the following to be a full, clear, and exact description of the same, reference being had to the accompanying drawings, which are made a part of this specification.

Figure 1:
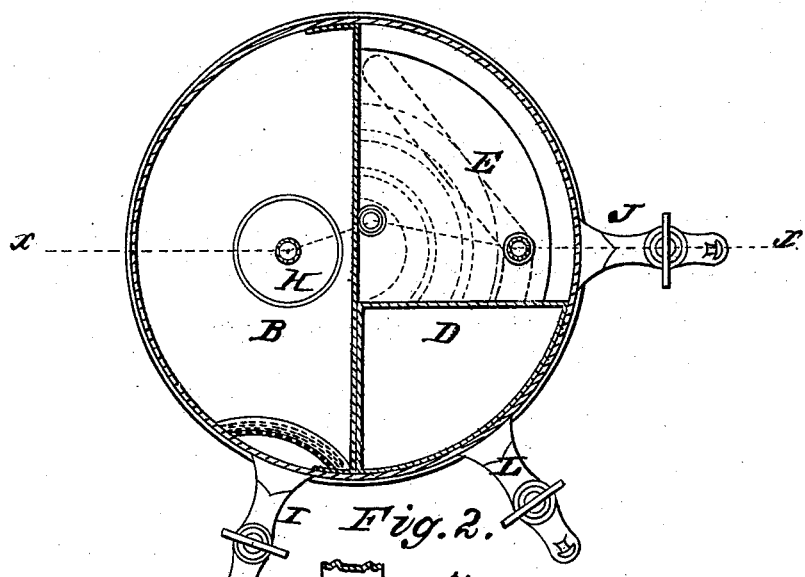
Figure 2:
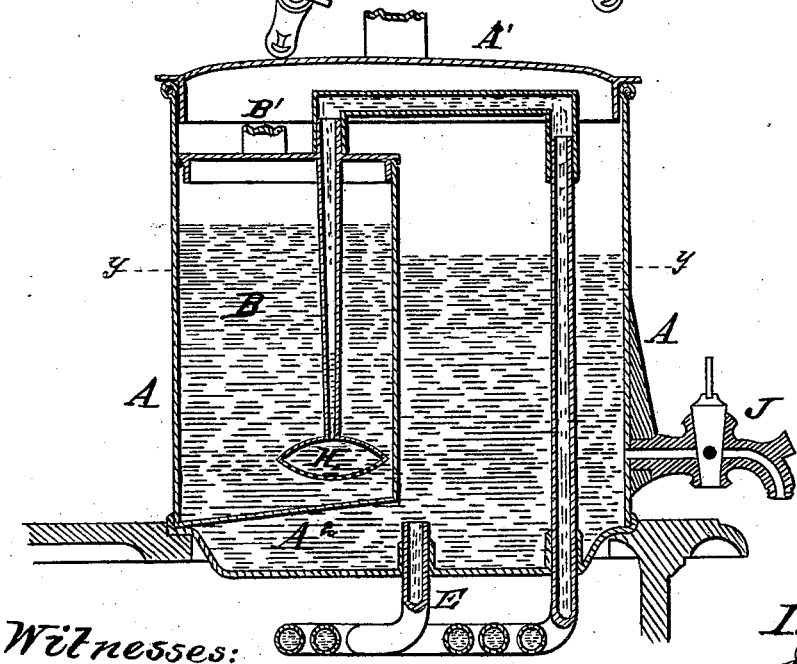

Figure 1 is a horizontal section at $y\ y$, Fig. 2, of a coffee-pot illustrating our invention. Fig. 2 is a vertical section of the same at $x\ x$, Fig. 1.

Similar letters of reference indicate corresponding parts in both views.

The nature of our invention consists in constructing a vessel with several compartments for making coffee or tea and at the same time heating milk and boiling water in the different compartments all at one and the same time, the water being heated in part by a coil of water or steam pipe attached to the bottom of the vessel. To the end of this coil of pipe we attach a connecting-pipe leading directly into the compartment used for making coffee or tea, and when the water in the coil reaches the boiling heat it is forced into the vessel containing ground coffee or tea, and thus mingling the hot water with these substances extracts from them the properties of coffee or tea, according to which may be used. The coffee or tea may be thrown into the vessel loose, or the same may be placed in a perforated receiver, which receiver may be attached to the end of the connection-pipe passing into the vessel, or the perforated receiver may be attached to the corner of the coffee or tea compartment on the inside with the connection-pipe leading into it, thus leaving the extract to pass below in the vessel. We construct the connecting-pipe so that it can be removed at pleasure for the purpose of stopping the flow of hot water into the coffee or tea reservoir. The compartments may be constructed so as to be permanently attached, or they may be so constructed as to be removed at pleasure and used in the manner that may be found the most desirable. The vessel and the compartments may be constructed of either metal, earthenware, or any other suitable and desirable substance. The milk-reservoir is heated by the action of the hot water, the vapor, or the steam which surrounds it, but does not come in contact with the contents, as the reservoir is closed with a well-adjusted cover.

To enable others skilled in the art to use our invention, we will proceed to describe the construction and operation of the same.

In the drawings, A represents the external shell or boiler, provided with a cover, A', and (as preferred) with a pit, $A^2$, to fit in the boiling-hole of a cooking-stove.

B represents the coffee (or tea) vessel provided with a lid, B'.

D represents the milk-boiler. The remainder of the main boiler is occupied by water.

E represents the water or steam coil, both ends of which pass through the bottom of the main boiler, the center end being very short, while the outer end passes up nearly to the top of the main boiler, and then connects with a conducting-pipe, F, which passes across, descends through the cover B' of the coffee-vessel B, and, extending nearly to the bottom of the latter, terminates in a rose, H, which may, if preferred, be adapted to be opened for the purpose of placing the coffee inside it, or the coffee may be placed in the vessel B, to be decocted by hot water delivered from the rose H.

I represents a faucet for coffee, J a water-faucet, and L a milk-faucet.

Operation: Tea or coffee is to be placed in the vessel B without water, and a full supply of water placed in the main boiler A. When the apparatus is placed on the stove, the steam generated in the coil causes an active circulation of water up the pipe, and the hot water is delivered in a shower upon the tea or coffee within the vessel B until a sufficient quantity of water has been supplied. The conducting-pipe is then disconnected, and the heat may thus be continued for any length of time without impairing the quality of the tea or coffee.

A three-way cock or a plurality of faucets may be arranged in the pipe, and may be operated from the outside to dispense with the necessity of disconnecting the pipe or removing the cover A.

Having thus described our invention, what we claim as new therein, and desire to secure by Letters Patent, is—

The combination of the vessels A and B and coil E, when so arranged that the pipe may be made to discharge into either vessel at will, substantially as and for the purpose set forth.

JAS. WILLARD PATTERSON.
JOS. STACY HILL.

Witnesses:
W. L. ALDRICH,
R. Z. FOSTER.